(12) United States Patent
Ruiz et al.

(10) Patent No.: US 9,403,112 B2
(45) Date of Patent: Aug. 2, 2016

(54) GRAPHENE OXIDE FILTERS AND METHODS OF USE

(71) Applicant: University of Dayton, Dayton, OH (US)

(72) Inventors: Oscar N. Ruiz, Bellbrook, OH (US); K. A. Shiral Fernando, Beavercreek, OH (US); Christopher E. Bunker, Kettering, OH (US)

(73) Assignees: The United States of America As Represented By The Secretary of the Air Force, Washington, DC (US); University of Dayton, Dayton, OH (US)

( * ) Notice: Subject to any disclaimer, the term of this patent is extended or adjusted under 35 U.S.C. 154(b) by 303 days.

(21) Appl. No.: 13/940,612

(22) Filed: Jul. 12, 2013

(65) Prior Publication Data

US 2013/0330833 A1 Dec. 12, 2013
US 2014/0199777 A2 Jul. 17, 2014

Related U.S. Application Data

(63) Continuation of application No. PCT/US2013/045378, filed on Jun. 12, 2013.

(60) Provisional application No. 61/658,483, filed on Jun. 12, 2012.

(51) Int. Cl.
*B01D 39/00* (2006.01)
*C02F 1/28* (2006.01)
(Continued)

(52) U.S. Cl.
CPC ............... *B01D 39/00* (2013.01); *B01D 23/14* (2013.01); *B01D 39/1692* (2013.01);
(Continued)

(58) Field of Classification Search
None
See application file for complete search history.

(56) References Cited

U.S. PATENT DOCUMENTS 3,457,171 A  7/1969  Flowers et al.
8,182,917 B2  5/2012  Robinson et al.
(Continued)

FOREIGN PATENT DOCUMENTS

CN  102908908 A  2/2013
WO  2012/028964 A2  3/2012
WO  2013/039895 A1  3/2013

OTHER PUBLICATIONS

Handbook of solvents, Wypych, editor, William Andrew Publishing, Toronto-New Yor, 2001, p. 68.*
(Continued)

*Primary Examiner* — Krishnan S Menon
(74) *Attorney, Agent, or Firm* — Dinsmore & Shohl LLP

(57) ABSTRACT

A system and device for filtering fluids using graphene oxide (GO) is provided. GO-based filters may be used for the efficient removal of microorganisms from organic and aqueous liquids and may be used to prevent fuel biodeterioration. Functionalization of graphene oxide with reactive oxygen functional groups provides physical properties to the GO including high solubility in polar solvents, good colloidal properties, low production costs, low toxicity, and a large surface area which can be decorated with antimicrobial agents including nanosilver. GO may be used as a filtration media for efficient removal of bacteria and to remove small amounts of water from hydrocarbon fuels. The GO filter media may be made of a plurality of GO particles, a structural core coated with GO, a non-porous structural membrane coated with GO, or a filtering membrane coated with GO. A method for sampling impurities found in an environmental sample is also provided.

26 Claims, 4 Drawing Sheets

(51) Int. Cl.
  B01D 71/02 (2006.01)
  B01D 24/00 (2006.01)
  B01D 39/16 (2006.01)
(52) U.S. Cl.
  CPC ............ *B01D 71/021* (2013.01); *C02F 1/281* (2013.01); *B01D 2239/0407* (2013.01); *B01D 2239/0442* (2013.01); *B01D 2239/0478* (2013.01); *B01D 2325/48* (2013.01); *Y10T 436/25* (2015.01)

(56) References Cited

U.S. PATENT DOCUMENTS

2006/0231792 A1  10/2006  Drzal et al.
2011/0114189 A1  5/2011  Crain et al.

OTHER PUBLICATIONS

International Search Report and Written Opinion pertaining to International Appl. No. PCT/US2013/045378, dated Aug. 9, 2013.
Ruiz, Oscar N., et al., "Graphene Oxide: A Nonspecific Enhancer of Cellular Growth." American Chemical Society, 2011, pp. 8100-8107, vol. 5, No. 10.
Nair, R.R., et al., "Unimpeded Permeation of Water Through Helium-Leak-Tight Graphene-Based Membranes," Science, Jan. 27, 2012, pp. 442-444 vol. 335.
Chen, Chengmeng, et al., "Self-Assembled Free-Standing Graphite Oxide Membrane," Advanced Materials, 2009, pp. 3007-3011, 21.
Wang, Zonghua, et al., "Novel Go-blended PVDF ultrafiltration membranes," Desalination, 2012, pp. 50-54, 299, Elsevier.
Das, et al., "Synthesis of silver nanoparticles in an aqueous suspension of graphene oxide sheets and its antimicrobial activity," Colloids and Surfaces B: Biointerfaces, 2011, pp. 16-22, 83, Elsevier.
Bao, Qi, et al., "Synthesis and characterization of silver nanoparticle and graphene oxide nanosheet composites as a bactericidal agent for water disinfection," Journal of Colloid and Interface Science, 2011, pp. 463-470, 360, Elsevier.
Acik, et al., "The Role of Oxygen during Thermal Reduction of Graphene Oxide Studied by Infrared Absorption Spectroscopy," The Journal of Physical Chemistry, 2011, pp. 19761-19781, 115, American Chemical Society.
Dreyer, et al., "The Chemistry of Graphene Oxide," Chemical Society Reviews, 2010, pp. 228-240, 39.
Gao, et al., "New Insights into the structure and reduction of graphite oxide," Nature Chemistry, Jul. 5, 2009, DOI:10.1038/NChem.281, Macmillan Publishers Limited.
Park, et al., "Colloidal Suspensions of Highly Reduced Graphene Oxide in a Wide Variety of Organic Solvents," Nano Letters, 2009, pp. 1593-1597, vol. 9, No. 4, American Chemical Society.
Schniepp, Hannes C., et al., "Functionalized Single Graphene Sheets Derived from Splitting Graphite Oxide," The Journal of Physical Chemistry B Letters, 2006, pp. 8535-8539, 110, American Chemical Society.
Durbin, D.J., et al., "Theoretical Investigation of the Use of Doped Graphene as a Membrane Support for effective CO Removal in Hydrogen Fuel Cells," Molecular Simulation, Nov. 2012, pp. 1061-1071, vol. 38, Issue 13.
Durbin, D.J. et al., "Density Functional Theory Analysis of Metal/Graphene Systems as a Filter Membrane to Prevent CO Poisoning in Hydrogen Fuel Cells," Journal of Physical Chemistry C., 2011, pp. 808-815, vol. 115, Issue 3.
Blankenburg, Stephan, et al., "Porous Graphene as an Atmospheric Nanofilter," Small, 2010, pp. 2266-2271, vol. 6, Issue 20.
Suk, Myung E., et al., "Water Transport through Ultrathin Graphene," Journal of Physical Chemistry Letters, 2010, pp. 1590-1594, vol. 1, Issue 10, American Chemical Society.
Boehman, Andre L., et al.; Impact of Biodiesel Blending on Diesel Soot and the Regeneration of Particulate Filters, Energy & Fuels, 2005, pp. 1857-1864, Journal 2005, vol. 19, Issue 5.
Dikin, Dmitriy, et al., "Preparation and Characterization of Graphene Oxide Paper," Nature, Jul. 26, 2007, pp. 457-60, vol. 488, Issue 7152, Nature Publishing Group.
Lerf, A., et al., "Structure of Graphite Oxide Revisited," Journal of Physical Chemistry, 1998, pp. 4477-4482, 102, American Chemical Society.
Gomez-Navarro, C., et al., "Atomic Structure of Reduced Graphene Oxide," Nano Letters, 2010, pp. 1144-1148, 10, American Chemical Society.
Wang, B., et al., "Graphene Oxides as Substrate for Enhanced Mammalian Cell Growth," Journal of Nanomaterials & Molecular Nanotechnology, 2012, pp. 1-4, 1:2.
Dume, B., "Graphene oxide encourages cells to grow," Oct. 28, 2011, pp. 1-2, nanotechweb.org.

* cited by examiner

GRAPHENE OXIDE FILTERS AND METHODS OF USE

CROSS-REFERENCE TO RELATED APPLICATIONS

The present application is filed under 35 U.S.C. 111(a) as a continuation of International Patent Application No. PCT/US2013/045378, filed Jun. 12, 2013, which international application designates the United States and claims the benefit of U.S. Provisional Application Ser. No. 61/658,483, filed Jun. 12, 2012.

GOVERNMENT INTERESTS

The present invention was federally funded, in part, by the Air Force Research Laboratory Fuels and Energy Branch—contract number FA8650-10-2-2934. The government has certain rights in the invention.

BACKGROUND

The present invention relates generally to the application of graphene oxide materials to the filtration of fluids.

Microorganisms are known to colonize and biodeteriorate hydrocarbon fuels. Multiple species of bacteria have been isolated from fuel storage tanks, pipelines, and aircraft wing tanks. Some of the problems associated with microbial growth in aviation fuels include wing and storage tank corrosion, fuel pump failures, filter plugging, injector fouling, topcoat peeling, engine damage, and deterioration of fuel chemical properties and quality. Extensive microbial growth and biofilm formation can lead to costly and disruptive damage to fuel systems and aircraft hardware.

Currently, prevention of fuel biodeterioration relies on housekeeping practices including removal of water from fuel using fuel-water coalescers and filtration of coarse particulates. Filtration is used to remove coarse impurities. However, even the best fuel filters are incapable of completely filtering out particles smaller than 10 µm in diameter; microorganisms can range from less than a micrometer to a few micrometers in size. Due to their small pore size, 0.22-0.45 µm filters are difficult to use because they present a strong barrier to fuel flow. The removal of free water from fuel also has a large impact on prevention of biodeterioration, or biofouling, given that microorganisms require water to grow. Additionally, military jet fuels are treated with an antimicrobial additive known as diethylene glycol mono-methyl ether (DiEGME), to prevent microbial growth and formation of biofilms. However, the use of this additive is expensive and may present adverse effects to the environment. The present disclosure is directed toward the effective filtration, purification, and prevention of biodeterioration of liquids, including fuels, using graphene oxide (GO).

BRIEF SUMMARY

In accordance with one embodiment of the present disclosure, a filter or collection device comprising a fluid inlet, a filtrate outlet, a filtering chamber, and a filter medium is described. The fluid inlet and the filtrate outlet are in fluid communication with the filtering chamber. The filter medium, which resides in the filtering chamber, comprises polar graphene oxide and has at least one reactive oxygen functional group. The polarity of the polar graphene oxide exceeds approximately 0.25 on the $E_T^N$ scale while comprising an oxygen content exceeding approximately 15%.

In accordance with another embodiment of the present disclosure, a filter or collection device comprises a polar graphene oxide filter medium characterized by a polarity exceeding approximately 0.25 on the $E_T^N$ scale and an oxygen content exceeding that of reduced graphene oxide.

In accordance with yet another embodiment of the present disclosure, a system for filtering fluids comprising a target fluid fluidly coupled to a target fluid inlet is described. The system comprises a fluid inlet, a filtrate outlet, a filtering chamber, and a filter medium. The filter medium, which resides in the filtering chamber, comprises polar graphene oxide and has at least one reactive oxygen functional group. The polarity of the polar graphene oxide filter medium exceeds approximately 0.25 on the $E_T^N$ scale while comprising an oxygen content exceeding approximately 15%.

In accordance with yet another embodiment of the present disclosure, a method for sampling impurities in an environmental sample utilizing a collection device is described. The collection device comprises a fluid inlet, a filtrate outlet, a sampling chamber, and a graphene oxide sampling medium. The fluid inlet and the filtrate outlet are in fluid communication with the sampling chamber within which the sampling medium resides. The sampling media comprises polar graphene oxide comprising at least one reactive oxygen functional group and is characterized by a polarity exceeding approximately 0.25 on the $E_T^N$ scale and an oxygen content exceeding approximately 15%. The method further comprises exposing the environmental sample to the polar graphene oxide sampling medium such that the polar graphene oxide sampling medium traps impurities residing in the environmental sample.

BRIEF DESCRIPTION OF THE SEVERAL VIEWS OF THE DRAWINGS

The following detailed description of the preferred embodiments of the present invention can best be understood when read in conjunction with the following drawings.

DETAILED DESCRIPTION

Figure 1A:
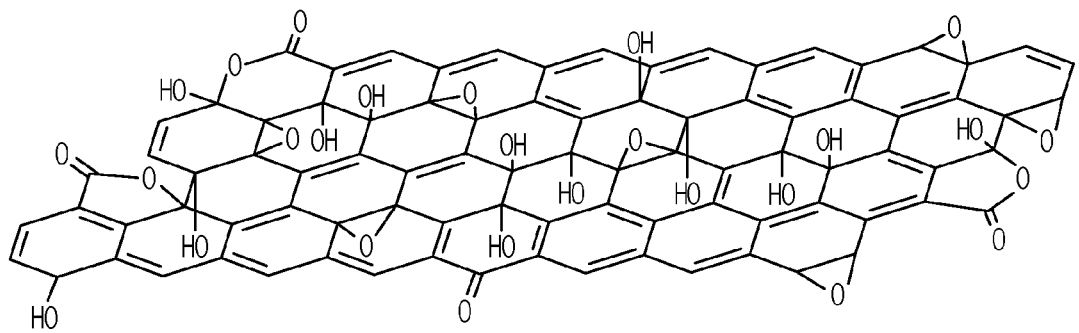
FIGS. 1A-C and 2A-D show possible structures of GO.
Figure 1B:
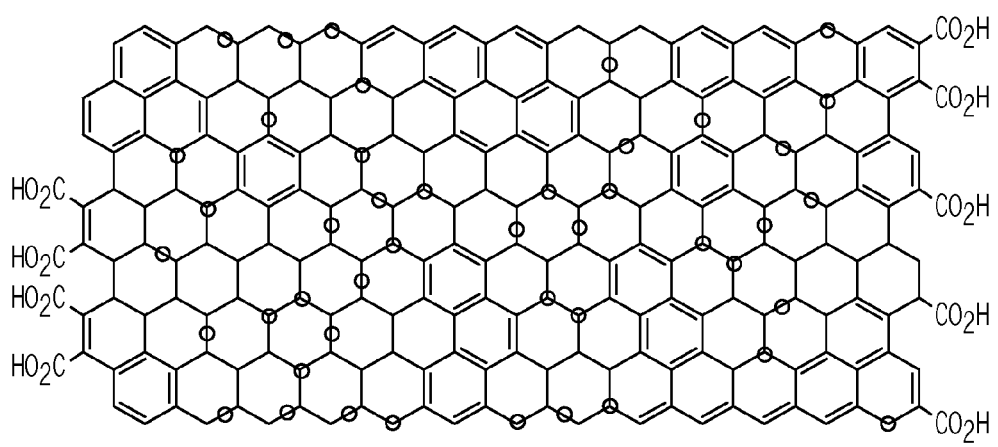
Figure 1C:
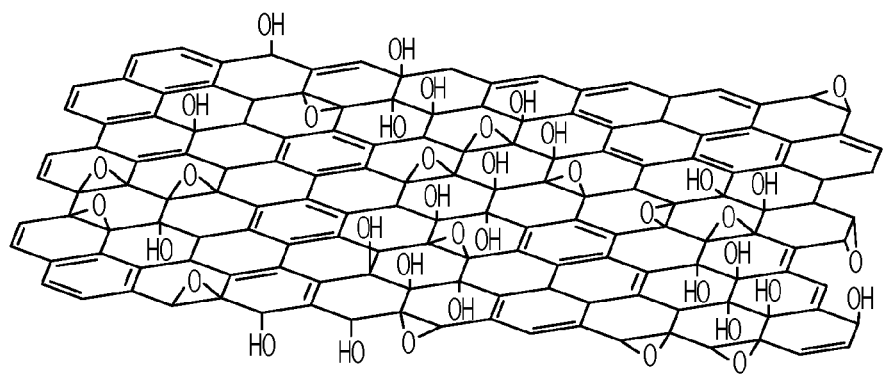
Figure 2A:
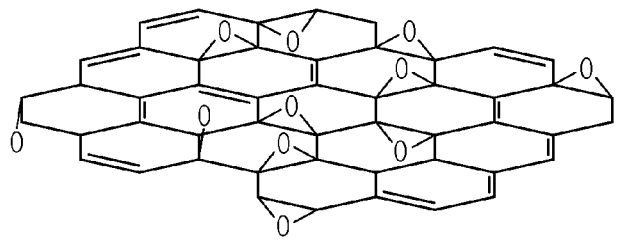
Figure 2B:
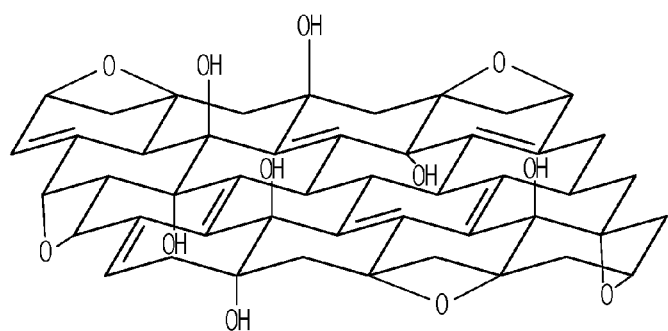
Figure 2C:
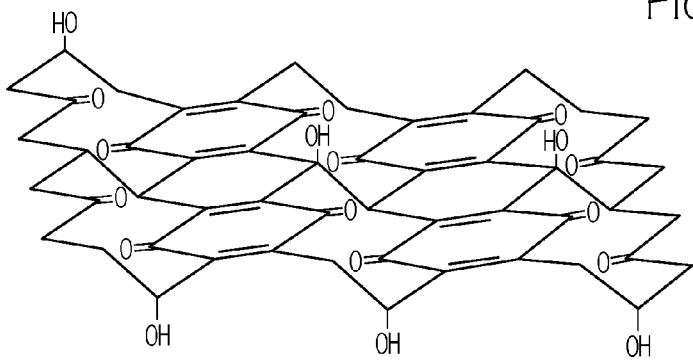
Figure 2D:
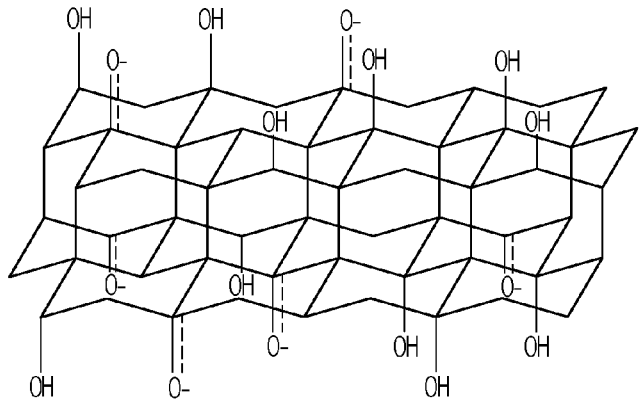

GO, a nanomaterial sheet formed by monolayers of functionalized carbon atoms arranged in thick honeycomb arrays, is an excellent material for many applications. The presence of reactive hydroxyl, epoxyl, and carboxyl functional groups on the surface of GO provide physical properties including high solubility in polar solvents, good colloidal properties, low production costs, low toxicity, and a large surface area which can be decorated with antimicrobial agents including nanosilver. The degree of surface functionalization imparted to the GO during oxidation determines the solubility of GO in water. Further, while aqueous solutions strongly interact with GO, organic solvents such as jet fuel tend to be repelled by GO.

Applications for GO include use in water, fuel, and solvent microbial purification; single-step kits for rapid extraction and purification of nucleic acids (DNA, RNA), proteins, and cellular metabolites from eukaryotic and prokaryotic cells; surface coatings that inhibit bacteria and virus growth and contamination; encapsulation of high value cell lines and organisms to protect cells and increase product yield. As GO has been shown to promote the attachment of prokaryotic and eukaryotic cells and to enhance cell attachment, differentiation, and proliferation, GO may serve as a coating for conventional tissue culture matrices, as culture media additives, and as free-standing film matrices or porous gel-like structures for cell and tissue growth. GO has also shown promise in the biomedical field as it promotes the attachment of drugs and antimicrobial agents and enhances the encapsulation of cells.

GO-based filters may be used for the efficient removal (sterilization) of microorganisms from organic and aqueous liquids; high volume rate filtration due to low pressure buildup (backpressure); and the removal of small quantities of free water from fuels and organic solvents. To prevent biodeterioration of fuels, microorganisms must be removed from fuel before it is stored in tanks and aircrafts. With the development of new biofuels that are more environmentally friendly, but that have a greater potential for biodegradation, new methods to prevent fuel biodeterioration is needed.

In one embodiment of the present invention, GO filters for the purification and sterilization of fuels are disclosed. GO can be used as a filtration media for efficient removal of bacteria from hydrocarbon fuels. GO-based filters remove bacteria from fuel with an efficiency ≥99.9%. Additionally, these filters remove small amounts of water from fuels further demonstrating the applicability of GO filters to serve as a last stage water removal system in fuel storage applications; free water present in fuel can lead to engine malfunction due to freezing and increased microbial growth. Furthermore, the GO filters allowed rapid flow of fuel with low resistance.

Upon interaction with GO, bacteria cells rapidly and irreversibly attach to the GO. Scanning electron microscopy (SEM) and fluorescent microscopy studies confirm that GO preparations lack lytic and antibacterial activity; cells in contact with GO retain structural integrity. Additionally, GO has the ability to bind nanosilver (Ag) and increase antimicrobial activity against Gram negative and Gram positive bacteria, and has the ability to form free standing structures and films. These observations significantly increase our understanding of the biological properties of GO and provide new bioengineering applications in the area of fuels and organic solvents purification.

Referring initially to FIGS. 1A-C and 2A-D, possible structures of GO sheets are shown. As the detailed structure of GO is unclear and depends largely on the chemical preparation of GO, several models of the structure are shown. GO sheets comprise monolayers of carbon atoms that form dense honeycomb structures with unique characteristics. GO contains a range of reactive oxygen functional groups that facilitate the application of GO in bioengineering. The solubility of GO in solvents, especially water, is important for applications in bioengineering. The maximum solubility of GO in a solvent depends both on the solvent polarity and the extent of surface functionalization imparted during oxidation. The surface of GO, when made from the Hummer's method, has oxygen functional groups, such as hydroxyl, epoxyl and carboxyl, which enable GO to be readily dispersed in water.

Figure 3:
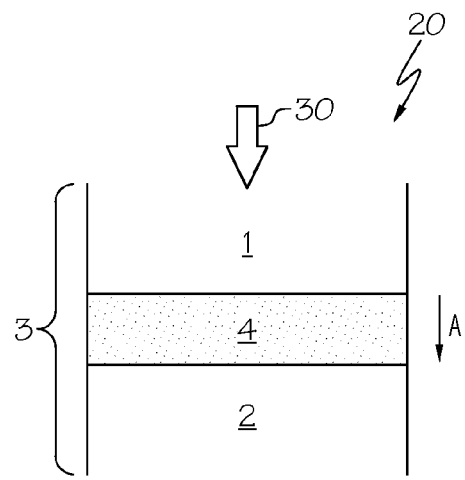
FIG. 3 is a schematic view of a system for filtering fluids comprising a filter or collection device.

Referring now to FIG. 3, an embodiment of the present disclosure including a system for filtering fluids comprising a target fluid 30, flowing in direction A, and a filter or collection device 20 comprising a fluid inlet 1, a filtrate outlet 2, a filtering chamber 3, and a filter medium 4 is shown. The target fluid 30 is fluidly coupled to the fluid inlet 1 and the fluid inlet 1 and the filtrate outlet 2 are in fluid communication with the filtering chamber 3. The filter medium 4, which resides in the filtering chamber 3, is made up of polar GO which may be flakes, a film, a powder, a solution, a suspension, or a GO coated substrate. The GO has a polarity exceeding approximately 0.25 on the $E_T^N$ scale. In other embodiments of the present disclosure, the GO has a polarity exceeding approximately 0.5 on the $E_T^N$ scale or a polarity exceeding approximately 0.65 on the $E_T^N$ scale.

The target fluid 30 may contain DNA, RNA, microorganisms or cells which may be selected from microbes, bacteria, fungi, yeast, algae, or combinations thereof. The target fluid 30 may be a non-polar fluid or an organic solvent. The organic solvent may comprise hydrocarbons, a hydrocarbon mixture, water, a hydrocarbon-water mixture, or combinations thereof or may be a combustible fuel such as kerosene, jet fuel, gasoline, diesel, or combinations thereof. Further, the filter medium 4 may comprise a biocide or antimicrobial agent which, in some embodiments, is silver nanoparticles.

Further, the GO has been functionalized so that the GO includes at least one reactive oxygen functional group and has an oxygen content exceeding approximately 15%. The reactive oxygen functional group may be an ether, hydroxyl, epoxide, ketone, carbonyl, or carboxyl group, or combinations thereof.

Here, oxygen content represents the atomic percent of oxygen atoms present in the polar GO filter medium 4 as approximately 66% carbon to approximately 33% oxygen corresponding to an atomic ratio of carbon to oxygen of approximately 2:1.

In other embodiments of the present disclosure, the oxygen content of the polar GO may be between approximately 30% and approximately 33% or may be approximately 33%. In any event, the oxygen content and the polarity of the polar GO exceed that of reduced GO.

In one embodiment, the filter or collection device 20 is configured as a column filter. In another embodiment the filtering chamber 3 may be a fuel storage vessel with the filter medium 4 residing on interior walls of the fuel storage vessel filtering chamber 3.

Figure 7:
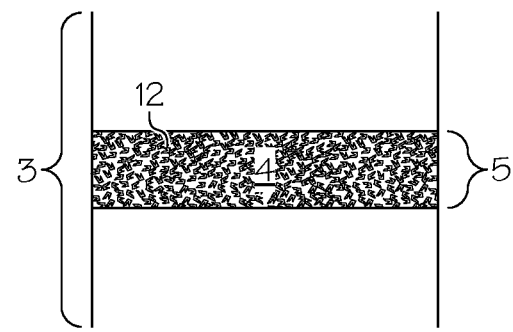
FIG. 7 is a view of one embodiment of the present disclosure showing a filtering chamber comprising GO particles.

Referring now to FIG. 7, showing an embodiment of the present disclosure, the filter medium 4 may be made up of a plurality of distinct bulk GO filter particles 12 that are packed into a filtering unit 5 within the filtering chamber 3. The GO filter particles 12 may have a maximum cross-sectional dimension may be at least approximately 5 millimeters. The plurality of distinct bulk GO filter particles 12 are packed into the filtering unit 5 at a filter particle packing density that permits gravity-induced fluid flow in the direction of Arrow A from the fluid inlet 1 to the filtrate outlet 2, through the packed GO filter particles 12 of the filter medium 4 in the filtering chamber 3. The GO filter particles 12 are packed into the filtering unit at a filter particle packing density between approximately 0.01 g/cm³ and approximately 1 g/cm³ or more preferably at a filter particle packing density between approximately 0.1 g/cm³ and approximately 0.5 g/cm³. The plurality of distinct bulk GO filter particles 12 comprise a maximum cross-sectional dimension between approximately 100 micrometers and approximately 5 millimeters and are packed into the filtering unit at a filter particle packing density between approximately 0.01 g/cm³ and approximately 1 g/cm³. In another embodiment of the present invention, the plurality of distinct bulk GO filter particles 12 comprise a maximum cross-sectional dimension between approximately 100 micrometers and approximately 1 millimeter and are packed into the filtering unit at a filter particle packing density between approximately 0.1 g/cm³ and approximately 1 g/cm³.

Figure 4:
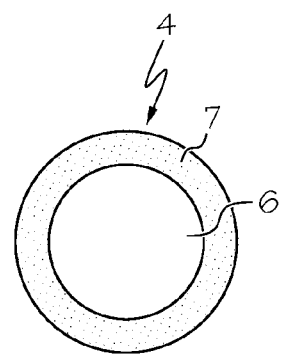
FIG. 4 is a view of one embodiment of the present disclosure showing a GO coating surrounding a structural core.

Referring now to FIG. 4, an embodiment of the present disclosure showing the filter medium 4 comprising a structural core 6 surrounded by a layer of GO 7. The structural core 6 is non-graphitic and may be of any shape. It will be understood that while the structural core 6 is depicted as a sphere, the structural core 6 may be any regular or irregular shape. The structural core 6 may be a bead of glass, polymer, metal, ceramic, carbon, or combinations thereof and may be inert.

The layer of polar GO 7 surrounding the structural core 6 is made up of a plurality of distinct GO filter particles 12 and is at least approximately 1 micrometer in thickness and may be between approximately 1 micrometer and approximately 1 millimeter in thickness. In another embodiment of the present disclosure, the layer of polar GO 7 is between approximately 1 micrometer and approximately 50 micrometers. The GO filter particles 12 comprise a maximum cross-sectional dimension of between approximately 200 micrometers and approximately 4 millimeters. In another embodiment of the present disclosure, it is contemplated that the GO filter particles 12 comprise a maximum cross-sectional dimension of at least approximately 200 micrometers and approximately 1 millimeter.

A plurality of structural cores 6 surrounded by a layer of GO 7 are packed into the filtering unit 5. The packed plurality of GO coated structural cores 6 together make up the filter medium 4 of the device 20. The plurality of structural cores 6 surrounded by a layer of GO 7 are packed at a filter particle packing density selected to permit gravity-induced fluid flow from the fluid inlet 1 to the filtrate outlet 2, through the packed GO filter medium 4 in the filtering chamber 3. The filter particle packing density is between approximately 0.2 g/cm³ and approximately 11 g/cm³ and more preferably between approximately 0.2 g/cm³ and approximately 1.5 g/cm³ and depends on the composition of the core (a filter particle packing density of 0.2 g/cm³ corresponds to charcoal while 11 g/cm³ corresponds to metal).

The plurality of distinct GO filter particles 12 making up the layer of GO 7 comprise a maximum cross-sectional dimension between approximately 200 micrometers and approximately 4 millimeters and are packed into the filtering unit 5 at a filter particle packing density between approximately 0.2 g/cm³ and approximately 11 g/cm³. In yet another embodiment of the present disclosure, the plurality of distinct GO filter particles 12 comprise a maximum cross-sectional dimension between approximately 200 micrometers and approximately 1 millimeter and are packed into the filtering unit at a filter particle packing density between approximately 0.2 g/cm³ and approximately 1.5 g/cm³. In another embodiment of the present disclosure, the plurality of distinct GO filter particles 12 comprise a maximum cross-sectional dimension between approximately 200 micrometers and approximately 4 millimeters and are packed into the filtering unit 5 at a filter particle packing density between approximately 0.2 g/cm³ and approximately 11 g/cm³. In yet another embodiment of the present disclosure, the plurality of distinct GO filter particles 12 comprise a maximum cross-sectional dimension between approximately 200 micrometers and approximately 1 millimeter and are packed into the filtering unit at a filter particle packing density between approximately 0.2 g/cm³ and approximately 1.5 g/cm³.

Figure 5:
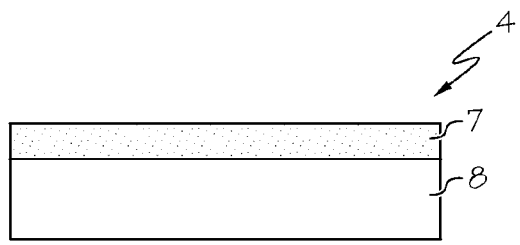
FIG. 5 is a view of one embodiment of the present disclosure showing a GO coating on a non-porous structural membrane.

Referring now to FIG. 5, an embodiment of the present disclosure shows a non-porous structural membrane 8 with a layer of polar GO 7 together making up the filter medium 4 wherein the polar GO filter medium 4 is configured as a GO coating on at least one surface of a non-porous structural membrane 8. The non-porous structural membrane 8 may be graphitic or non-graphitic and may be inert. The layer of polar GO 7 may be at least approximately 1 micrometer and may be between approximately 1 micrometer and approximately 1 millimeter. More preferably, the thickness of the layer of GO 7 is between approximately 1 micrometer and approximately 50 micrometers. The non-porous structural membrane 8 may generally be made of glass, polymer, metal, plastic, or combinations thereof and more specifically be a glass slide, a polystyrene slide, a silicon wafer, or combinations thereof.

Figure 6:
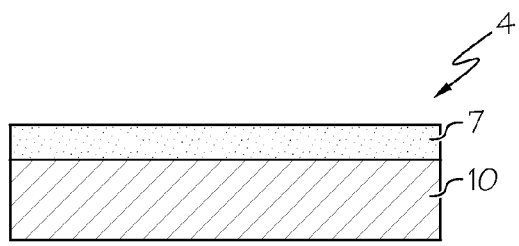
FIG. 6 is a view of one embodiment of the present disclosure showing a GO coating on a filtering membrane.

Referring now to FIG. 6, an embodiment of the present disclosure shows a porous filtering membrane 10, configured to remove non-biological impurities from polar solvents such as water, and comprising a layer of polar GO 7 together making up the filter medium 4 wherein the polar GO filter medium 4 is configured as a GO coating on at least one surface of the porous filtering membrane 10. The porous filtering membrane 10 may be graphitic or non-graphitic and may be inert. The layer of polar GO 7 may be at least approximately 1 micrometer and may be between approximately 1 micrometer and approximately 1 millimeter. More preferably, the thickness of the GO layer 7 is between approximately 1 micrometer and approximately 50 micrometers. The non-porous structural membrane 8 may generally be made of metal, plastic, paper, polymer, ceramic, carbon, or combinations thereof. The non-porous structural membrane 8 may be planar and may comprise alumina or charcoal. The porous filtering membrane is configured to filter polar solvents.

Figure 8:
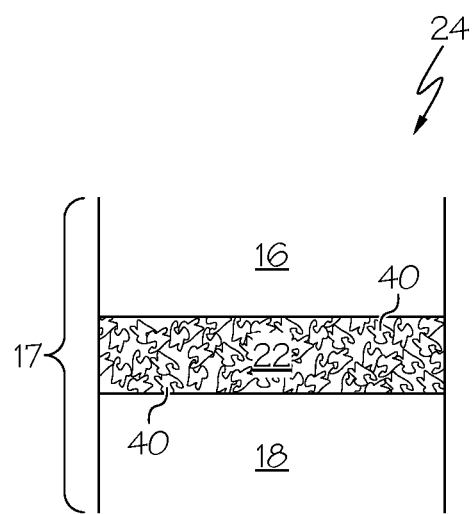
FIG. 8 is a view of one embodiment of the present disclosure showing a collection device for environmental sampling.

Referring now to FIG. 8, a method for sampling impurities in an environmental sample is described. The method includes utilizing a collection device comprising a fluid inlet 16, a filtrate outlet 18, a sampling chamber 17, and a GO sampling medium 22. The fluid inlet 16 and the filtrate outlet 18 are in fluid communication with the sampling chamber 17. The sampling medium 22, which resides in the sampling chamber 17, is made up of polar GO comprising at least one reactive oxygen functional group. The GO has a polarity exceeding approximately 0.25 on the $E_T^N$ scale. In other embodiments of the present disclosure, the GO has a polarity exceeding approximately 0.5 on the $E_T^N$ scale or a polarity exceeding approximately 0.65 on the $E_T^N$ scale.

Further, the GO has been functionalized so that the GO includes at least one reactive oxygen functional group and has an oxygen content exceeding approximately 15%. The reactive oxygen functional group may be an ether, hydroxyl, epoxide, ketone, carbonyl, carboxyl groups, or combinations thereof.

The method further comprises exposing the environmental sample to the polar GO sampling medium 22 to trap impurities 40 residing in the environmental sample in the polar GO sampling medium 22. The trapped impurities 40 may then be released from the polar GO sampling medium and analyzed or stored for future use. In another embodiment of the present disclosure, the method further comprises analyzing the trapped impurities 40 in situ, without releasing the impurities from the polar GO sampling medium 22. The trapped impurities 40 include microorganisms, cells, or combinations thereof. The microorganisms include microbes, bacteria, fungi, yeast, algae, or combinations thereof. The environmental sample may be a sample of air, water, soil, or combinations thereof or may be saliva, sweat, blood, bodily secretions, or combinations thereof and may be in the form of a solid surface, liquid surfaces, a liquid, a food sample or combinations thereof.

EXAMPLES

The following examples are given to illustrate specific embodiments of the present invention and are in no way intended to limit the scope of the disclosure in this application.

Examples of GO Applications

Organic Solvent Sterilization and Purification Application.

The use of organic solvents in the pharmaceutical and biomedical industry, and in biochemistry, biology and biomolecular laboratories and hospitals is ubiquitous. For multiple applications, sterile solvents that are free of microorganisms are required. However, the sterilization of organic solvents is a difficult and cumbersome process relying on the use of small pore size filters (0.22 to 0.45 µm) that presents a barrier to solvent flow. Other sterilization procedures, such as autoclaving or UV irradiation, cannot be applied to solvents because their properties can deteriorate and may be hazardous to workers. GO media can be used to form columns, filters, coatings and films that can be used to sterilize organic solvents with ease. The GO filtering matrix provides a simple sterilization procedure, based on binding and trapping the microbial cells, that dramatically reduces the time and pressures required for filtration and sterilization of organic solvents, solvent mixtures and fuels while being very user-friendly.

Environmental Sampling Media.

Because GO presents a preferred surface for the attachment of cells, graphene oxide matrices can be applied in the sampling and collection of microorganisms (bacteria, fungi, yeast, algae, and other) and cells from different environmental samples such as air, water, soil, solid and liquid surfaces; medical samples including saliva, sweat, blood, bodily secretions and fluids; food samples, and others. Once the microorganism, cell, or virus has attached to the GO media and is trapped, the GO matrix can be treated to recover intact viable cells or nucleic acids, proteins, and biomolecules for analysis. Otherwise, the GO matrix with the attached cells can be stored for future analysis.

Fuel Purification/Sterilization Media.

GO can be applied as a sole column or filter matrix, in combination with a support media, or in combination with existing fuel and lubricant filters for the removal of microorganisms from these fluids. The purpose of the GO media will be the removal of biological contaminants, including bacteria, fungi, yeast, algae, and other cells.

Microbial Removal as Part of Existing Filters.

Filters are commonly used in the automotive, aircraft, watercraft and power generation industry for removal of different impurities from fuel, oil, lubricants and hydraulic fluids. However, these filters fail to remove biological contaminants from these fluids. GO can be used as a part of these existing filters to remove microorganisms and cells from fluids.

Water Purification Media.

GO in the form of columns, filters, films, powder, suspensions and as a part of existing filters may be combined with silver and other antimicrobial agents to be used in water purification applications.

Cell Growth Promotion.

GO-based materials do not present antimicrobial or cytotoxic characteristics but instead actively promote cellular growth and differentiation. In fact, GO does not have intrinsic antibacterial, bacteriostatic, or cytotoxic properties in either bacteria or mammalian cells, but rather acts as a general enhancer of cellular growth by increasing cell attachment and proliferation. GO may be used as a scaffold for cell surface attachment and proliferation.

Experimental Examples

Example 1

GO Column Filter

A GO filter for the removal of microorganisms from jet fuel is described. Jet-A fuel samples were inoculated with bacteria and then subjected to filtration and characterized for filtration efficiency. Biomolecular approaches, including quantitative real-time PCR (qPCR), cell-based colony counting, scanning electron microscopy (SEM), and fluorescent microscopy, were applied to demonstrate the efficiency, functionality and mode of action of the GO filter.

GO was synthesized using a modified version of the Hummers method. Filter columns were developed by packing 32 mg and 260 mg of thin, flakes of GO in to 0.5 and 2.5 ml plastic syringe casings, respectively. The 32 and 260 mg GO columns were tested for their ability to remove Gram positive and Gram negative bacteria from 7 ml and 7,000 ml of jet fuel, respectively. To reduced variability in the tests and maintain constant flow rates the 260 mg GO columns were tested as part of an apparatus that allowed using the laboratory vacuum system (50 kPa). For the 32 mg column, flow pressure was provided by a mechanical pipette.

The GO was then analyzed using fluorescent microscopy and SEM to determine if bacteria cells attached to the GO matrix and if the cells retained viability. It was determined that cells attached to the GO but that the interaction of the cells with GO did not lead to cell lysis. SEM was performed to confirm the presence of intact bacteria on the surface and within the GO matrix. At a magnification of 4500×, the SEM showed a large number of bacteria attached to the GO matrix. At higher magnification, it was observed that individual cells were strongly attached to the GO surface. The interaction of bacteria with the GO surface appeared to induce morphological changes particularly in the bacteria cell wall and cell membrane. The highest magnification SEM showed that while cells did change morphology in comparison to untreated bacteria, the cells seemed to maintain their integrity. These results further confirmed that GO lacks antibacterial, cytotoxic, and bacteriostatic properties.

Characterization of Cell Binding Strength to GO:

The strength of the cell binding to the GO filter matrix was next tested. In order to evaluate binding strength, cell recovery following binding to the GO matrix using mild or harsh DNA extraction protocols was assessed. If the cells attached strongly to the GO matrix, the DNA yield under the mild conditions would be low, but under harsh conditions, yields comparable to the glass wool (GW) control matrix were expected. The results demonstrated this trend and confirmed that under mild treatment, the amount of DNA recovered ($2.15 \times 10^7$ gene copies/ml) from the GO matrix was 47 times lower than the DNA level recovered from GW ($1.02 \times 10^9$ gene copies/ml). The lower concentration of DNA recovered from GO under mild treatment in comparison to GW samples is an indication that the mild treatment was not capable of releasing cells that were tightly bound to the GO matrix. However, this treatment was sufficient to recover high DNA concentration from the GW matrix which did not induce strong attachment. Higher DNA concentration in the GW samples also indicated that the low speed centrifugation did not precipitate free bacterial cells in solution. However, cells strongly attached to GO co-precipitated together with the GO matrix. Detection of low levels of DNA in the GO samples under mild treatment can be explained by the release of free DNA from the GO matrix after hydration with aqueous media.

Under harsh treatment the concentration of DNA recovered from the GO matrix ($1.02\times10^9$ gene copies/ml) was similar to the levels recovered from GW under mild ($1.02\times10^9$ gene copies/ml) and harsh treatments ($1.40\times10^9$ gene copies/ml). These results indicate that by lysing the cells directly while they are still attached to the GO matrix, DNA is recovered in similar levels to those of the control samples. This revealed that once cells have attached to GO is very difficult to release them by mechanical treatment. This property is important in filter development because it will guarantee that the cells cannot be released from the filter once they are trapped by the filter.

Currently, there is no easy procedure to remove microorganisms from small and large volumes of fuel and other organic solvents. Currently the only way to sterilize small volumes (1-5 liters) of fuels and other organic solvents for laboratory experimentation require filtration through a 0.22 µM filter. This process is very cumbersome and can take over a half an hour per liter even with the application of high vacuum pressure. This type of approach is not feasible for the treatment and sterilization of large fuel volumes such as those moved through a fuel infrastructure. Thus, GO filters are able to filter similar amounts of fuel in a fraction of the time with minimal pressure buildup. This presents the possibility to scale up the filtration process to handle much larger volumes and is a true solution to the issue of fuel microbial contamination and deterioration.

Example 2

Synthesis of Ag-GO

GO was synthesized using a modified Hummers method. Ag-GO was prepared using a sonochemical method as follows. 50 mg of GO, 25 mg of silver acetate, and 15 ml of DMF were mixed in a three arm sonochemical flask (Sonics Inc., Suslick flask). The mixture was sonicated at 37% amplitude and 20 KHz for 20 minutes using a pulsed (1 second on, 1 second off) procedure. After the sonication, the solution turned black and was stable for a few hours without any noticeable precipitation. In the process of recovering Ag-GO, the mixture was transferred to a round-bottom flask and DMF was removed using a rotary evaporator. The remaining solid material was transferred to a centrifuge tube where it was washed with DI water and ethanol five times, respectively. The ethanol was dried by blowing nitrogen across the surface of the solution and the final Ag-GO product was recovered as a black powder.

Example 3

GO and Ag-GO Film (Paper) Preparation

In the film (paper) preparation of GO and Ag-GO, a suspension of GO or Ag-GO in DMF (0.7 mg/ml, 19 ml) was filtered through a PVDF membrane (Whatman, 0.45 pm, 47 nm diameter). The thin layer of the film formed on the membrane was then subsequently peeled away.

Example 4

Preparation of GO Film onto a Glass Slide

GO suspension was obtained by sonication of the obtained graphite oxide powder in water (approximately 250 µg/ml). 40 µl of GO suspension or about 10 µg of GO per slide was spotted using a micropipette onto a glass slide and the slide was allowed to evaporate in a fume hood to result in a thin GO film on the slide. For the blank control slide, ultrapure sterile water was spotted and allowed to dry. Glass slides with or without GO film were placed into a culture dish (10 cm in diameter) and treated with UV irradiation for 1 hour.

Example 5

Coating of PVDF Filters with GO 0.22 µm PVDF filters were coated with a 100 and 300 GO suspension containing 25 and 75 µg GO, respectively. Filter coating took place by releasing the GO solution evenly using a circular motion from a micropipette. The GO-coated filters were allowed to dry in the laminal flow hood under sterile conditions. Once dried, the GO-coated filters were used in the growth bioassay experiments.

Example 6

Quantitative Real-Time PCR Analysis of Genomic DNA

Real-time PCR analysis was performed on bacterial genomic DNA samples using the CFX real-time PCR system (BioRad, Hercules, Calif.) with a two-step amplification program with post-amplification melt curve analysis. 16S gene-specific real-time PCR primers and synthetic oligonucleotide standard were developed. The synthetic oligonucleotide was serial-diluted from $1\times10^8$ copies/µl to $1\times10^4$ copies/µl and used as standards for absolute quantification purposes. Real-time PCR sample reactions were produced by preparing a master mix containing the 16S gene-specific primers, BioRad SYBR Green SuperMix, water, and the appropriate sample DNA.

Example 7

Bacterial Proliferation in the Presence of Colloidal Graphene Oxide (GO)

To determine the effect of GO on bacterial growth, samples containing 5 ml Luria Bertani (LB) nutrient broth in 15 ml conical tubes were amended with GO to a final concentration of 25 µg/ml and then inoculated with *E. coli* bacterial cells to a concentration of 0.03 OD. The experimental control was produced by inoculating *E. coli* to 0.03 OD in 5 ml LB broth without GO. A minimum of triplicate reactions of each condition were incubated for 16 hours at 37° C., and then examined for bacteria growth. Surprisingly, the culture tubes containing GO did not visually show any apparent reduction in bacterial growth. Furthermore, they appeared more turbid than the control culture and a dense dark precipitate was observed at the bottom of the tube. The dark precipitate was not produced in the control cultures without GO. Growth level in the bacteria cultures was determined by measuring the absorbance at 600 nm. Samples were taken from the supernatant without disturbing the dark precipitate containing GO. The results showed that the GO-containing samples achieved an average absorbance of 1.7 in 16 hours of incubation while the bacteria growing in LB broth only achieved an absorbance of 1.3. These results indicated that bacteria in the presence of GO grew faster than bacteria in LB media and was able to achieve cell saturation sooner. The dark precipitate observed in samples containing GO may have been responsible for enhancing bacterial growth in the media, or harboring bacterial growth itself. To address this, samples of the dark precipitate were analyzed using scanning electron microscopy.

Scanning electron microscopy (SEM) analysis showed that the dark precipitate was formed by a thick bacterial biofilm containing a large mass of aggregated cells and extracellular polymeric material. A negative control reaction containing LB broth and GO, but no bacteria, showed the formation of lower density dark aggregates that did not precipitate to the bottom of the culture tube. When a colloidal suspension of GO in water is added to a solution media containing salts, the colloidal suspension aggregates and could falloff suspension producing low density aggregates. It is possible that precipitation required bacterial growth. The massive amount of cells observed in the biofilm indicate that there is a direct effect of GO in bacteria proliferation when colloidal GO is added to liquid media. Results showed that the precipitation of GO in the culture media may act as a scaffold for bacterial attachment, proliferation, and biofilm formation. Studies have shown that carbon nanomaterials could act as attachment surfaces where small colonies grow around tubular carbon nanostructures.

Further, precipitated GO induced massive cell growth, aggregation and secretion of extracellular polymeric substance (EPS). In the SEM images it was possible to observe void areas in the EPS with the shape of rod bacteria. This indicates that bacteria were directly responsible for secreting the EPS. The rod-shape voids observed may be due to the process of bacteria dispersal; a process in which bacteria evacuate the interior of biofilms due to competition or lack of nutrients, leaving behind hollow, shell-like structures.

Example 8

Characterization of Bacterial Growth on Graphene Oxide Surfaces

To determine if GO inherently possessed antibacterial or bacteriostatic activity, bacterial and mammalian cellular growth in the presence and absence of GO materials was determined by the development of carefully designed cell growth bioassays along with the use of quantitative real-time PCR (qPCR) analysis to accurately determine the cell number and the effect of GO on microbial proliferation. It was shown that GO materials do not adversely impact microbial and mammalian cell growth. Furthermore, GO materials tend to produce a dramatic increase in microbial and mammalian cell proliferation, indicating that GO is neither a bactericidal nor bacteriostatic material, but instead is a general growth enhancer that acts as a scaffold for cell surface attachment and proliferation. This is the first time that it has been conclusively demonstrated that GO does not have intrinsic antibacterial properties and cytotoxic properties.

Bacterial growth on filters coated with 25 and 75 µg GO grew two to three-times better than on filters without GO. Closer analysis showed that bacteria were able to attach and proliferate preferentially in areas containing the highest GO levels. GO films failed to produce growth inhibition zones around them, indicating a lack of antibacterial properties. Also, bacteria was able to grow on GO films to $9.5 \times 10^9$ cells from an initial inoculation of $1.0 \times 10^6$, indicating that GO materials also lack bacteriostatic activity. Furthermore, it is shown that GO materials can be functionalized with antimicrobial agents, including silver nanoparticles, to inhibit proliferation of microbial pathogens such as bacteria and viruses while retaining the beneficial characteristics that promote mammalian cell growth and differentiation. Thus, silver-coated GO films were able to produce clearing zones and cell death.

To determine the effect of GO when coated onto a surface, we coated sterile PVDF filters with 0 (neat), 100, and 300 µl of a 250 µg/ml colloidal suspension of GO, equal to 0, 25, and 75 µg GO per filter. Filters were allowed to dry and were then inoculated with bacteria by submerging into a solution containing E. coli at a concentration of 1×106 cells/mL for 1 minute. The filters were recovered, allowed to dry, placed onto a sterile culture plate, and then incubated for 18 hours at 37° C. After the incubation period pictures were taken and genomic DNA was extracted from each of the filters for further analysis.

Bacteria growth on filters with or without GO was determined by quantitative real-time PCR (qPCR) analysis of the bacteria genomic DNA. Bacteria growth was observed with the naked eye in all samples, but the filters containing GO presented large bacteria colonies around specific areas that seemed to contain more GO. qPCR was chosen over other methods of analysis because it allows precise determination of the level of cellular growth. To achieve cellular quantification, a qPCR assay that targeted the 16S ribosomal RNA (rrn) gene, a ubiquitous gene in all bacteria, and a synthetic oligonucleotide standard for quantification that spanned the amplicon region were used. This type of analysis provided the number of copies of the 16S rrn gene in the sample, which was then used to determine the exact number of cells by dividing the obtained sample gene copy number by the number of 16S rrn genes found in the E. coli cell; seven copies of the 16S rrn gene are found per E. coli cell. The qPCR results showed that the bacteria levels in filters containing GO was higher than that in the filters without GO. The filters containing 25 µg of GO had double the amount of bacteria than the neat filter, while the filter covered with 75 µg of GO had three times more cells that the neat filter. These results indicate that GO not only lacks antimicrobial properties, but that it actually enhances microbial growth when coated onto another surface.

Upon close inspection of the GO-coated and neat filters, interesting growth patterns that differentiate the GO-coated filters were observed. The GO-coated filters had easy to observe large cell colonies that followed a lined pattern around areas of higher GO content. These areas were observed in filters with 25 and 75 µg GO, but not in neat filters. Also, an area of dense bacterial growth in the sterile media was observed around all neat filter replicates. This halo of cells was not observed in any of the GO-coated filters. This demonstrated an inherent preference by bacteria to attach and grow in areas containing GO; especially those areas containing the highest GO levels.

Example 9

Bacteria Interaction with GO and Ag-GO Films (Papers)

Go and Ag-GO films were analyzed using TEM and XRD analysis to determine the morphology, size distribution, and the crystal structure of Ag nanoparticles. TEM analysis clearly showed that the GO sheets were well decorated with Ag nanoparticles and size distribution analysis performed using TEM showed that the average size of Ag nanoparticles on the surface of GO was 8 nm. In addition, XRD analysis revealed that the silver-decorated graphene oxide (Ag-GO) spectrum closely matched the peaks seen in the face-centered-cubic silver (ICDD 00-004-0783). The effect of solid GO films on bacteria growth was studied by inoculating GO films, Ag-GO films, and filter pieces with $E.\ coli$ bacteria. GO films were placed onto culture plates that were previously inoculated with $1\times10^6$ $E.\ coli$ cells per plate. Then, $1\times10^6$ $E.\ coli$ cells were directly inoculated on top of the film pieces and allowed to dry. The plates were incubated for 18 hours at 37° C. After the incubation period, genomic DNA was extracted from each of the filters for further analysis. The purpose of this type of inoculation was to observe growth over the GO film and also to determine if any growth inhibition zone was formed around the GO film. These inhibition areas would indicate that the material has some toxic effect on the bacteria.

Results showed that growth inhibition zones were not detected in the plate containing either GO film or filter paper. However, Ag-decorated GO showed large growth inhibition zones characterized by a clear area with no cell growth. These results clearly demonstrate that GO does not have antimicrobial effects capable of producing a toxic effect in the area surrounding the GO film. By decorating GO material with silver it was further demonstrated that GO materials are functional and capable of supporting common antimicrobial materials including silver.

qPCR performed to determine the growth level over the different films revealed that GO paper supported bacteria growth more efficiently than a PVDF filter. The results showed that the surface of the GO film contained $9.5\times10^6$ cells while the filter paper had $7.5\times10^9$ cells. The cell level over the Ag-GO paper was determined to be $3.5\times10^4$ cells, which was lower than the initial inoculation level of $1\times10^6$ cells; indicating that bacteria cell death was achieved. These results do not indicate any adverse or toxic effect of GO towards bacteria. Furthermore, GO promotes bacterial growth by enhancing attachment, proliferation, and biofilm formation.

Example 10

Mammalian Cell Attachment and Proliferation onto GO Film

Testing of the role of GO film on mammalian cell attachment and proliferation was performed. Control glass slides and glass slides coated with 10 μg of GO were placed onto a culture dish to which culture media and $6\times10^5$ mammalian colorectal adenocarcinoma HT-29 cells were added. The cells were allowed to attach and develop on the slides. At various time intervals, cell attachment was assessed by light microscopy. The results indicate that the mammalian cells attached more efficiently to the GO-coated glass slides and grew. The micrographs showed marked morphological changes and cell enlargement and spreading on the GO-coated glass slides, which are characteristic of effective cell attachment and cell growth. However, very few cells became attached to and developed on the plain glass slides (the control) as observed by the round shape of cells, indicating lack of cellular enlargement and growth. These results clearly show that the GO film, beyond not exerting any cytotoxic effects on the cells, actually promotes mammalian cell attachment and proliferation. These results indicate that GO is a great support for mammalian cell attachment, growth, and proliferation. These results compare positively against carbon nanotube materials which have been shown to be cytotoxic at various concentrations.

An embodiment of the present invention clearly demonstrates that GO has no antibacterial properties. Furthermore, GO lacks any bacteriostatic property as shown by the prolific growth observed on all forms of GO tested. GO acts as an enhancer of life, increasing not only mammalian cell growth but also bacterial growth. In the past, several studies have shown that GO is noncytotoxic to mammalian cells, but that it somehow acts as an antibacterial material. The GO production process shown in an embodiment of this invention, which includes long term dialysis, dilution, and sonication, takes great care in removing carryon impurities that could affect the properties of the material.

While certain representative embodiments and details have been shown for purposes of illustrating the invention, it will be apparent to those skilled in the art that various changes may be made without departing from the scope of the invention. It is noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or to function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

It is noted that terms like "preferably" and "commonly" when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the term "approximately" is utilized herein to represent the inherent degree of uncertainty that may be attributed to any quantitative comparison, value, measurement, or other representation. The term "approximately" is also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein. Further, it will be apparent that modifications and variations are possible without departing from the scope of the invention defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A fuel storage vessel for removing biological contaminants from fuel, the fuel storage vessel comprising a fuel inlet, a fuel filtrate outlet, a fuel filtering chamber, and a polar graphene oxide filter medium, wherein:
the fuel inlet and the fuel filtrate outlet are in fluid communication with the fuel filtering chamber;
the polar graphene oxide filter medium resides in the fuel filtering chamber; and
the polar graphene oxide filter medium comprises:
a honeycomb monolayer of carbon atoms functionalized with at least one reactive oxygen functional group, wherein the honeycomb monolayer is functionalized with silver nanoparticles, and wherein the honeycomb monolayer is configured as a coating on at least one surface within the fuel filtering chamber,
a polarity exceeding approximately 0.25 on the $E_T^N$ scale,
an oxygen content exceeding approximately 15%, and
an atomic ratio of carbon to oxygen of 2:1 such that the polar graphene oxide filter medium is effective to remove the biological contaminants from the fuel upon flow of the fuel therethrough.

2. The fuel storage vessel of claim 1 wherein the polar graphene oxide filter medium comprises a polarity exceeding approximately 0.5 on the $E_T^N$ scale.

3. The fuel storage vessel of claim 1 wherein the polar graphene oxide filter medium comprises a polarity exceeding approximately 0.65 on the $E_T^N$ scale.

4. The fuel storage vessel of claim 1 wherein the oxygen content of the polar graphene oxide filter medium is approximately 33%.

5. The fuel storage vessel of claim 1 wherein the atomic ratio of carbon to oxygen in the polar graphene oxide filter medium is approximately 66% carbon to approximately 33% oxygen.

6. The fuel storage vessel of claim 1 wherein:
the oxygen content of the polar graphene oxide filter medium exceeds that of reduced graphene oxide.

7. The fuel storage vessel of claim 1 wherein the at least one surface within the fuel filtering chamber is a non-porous structural membrane.

8. The fuel storage vessel of claim 1 wherein:
the at least one surface within the fuel filtering chamber is a non-porous structural membrane; and
the non-porous structural membrane is non-graphitic.

9. The fuel storage vessel of claim 1 wherein:
the at least one surface within the fuel filtering chamber is a non-porous structural membrane; and
the non-porous structural membrane is graphitic.

10. The fuel storage vessel of claim 1 wherein:
the at least one surface within the fuel filtering chamber is a non-porous structural membrane; and
the thickness of the coating is between approximately 1 micrometer and approximately 50 micrometers.

11. The fuel storage vessel of claim 1 wherein the at least one surface within the fuel filtering chamber is a porous filtering membrane.

12. The fuel storage vessel of claim 11 wherein the porous filtering membrane is non-graphitic.

13. The fuel storage vessel of claim 11 wherein the porous filtering membrane is graphitic.

14. The fuel storage vessel of claim 11 wherein the thickness of the coating is between approximately 1 micrometer and approximately 50 micrometers.

15. A fuel storage vessel for removing biological contaminants from fuel, the fuel storage vessel comprising a fuel inlet, a fuel filtrate outlet, a fuel filtering chamber, and a polar graphene oxide filter medium, wherein:
the fuel inlet and the fuel filtrate outlet are in fluid communication with the fuel filtering chamber;
the fuel filtering chamber has interior walls;
the polar graphene oxide filter medium resides on the interior walls of the fuel filtering chamber; and
the polar graphene oxide filter medium comprises:
a honeycomb monolayer of carbon atoms functionalized with at least one reactive oxygen functional group, wherein the honeycomb monolayer is functionalized with silver nanoparticles, and wherein the honeycomb monolayer is configured as a coating on the interior walls of the fuel filtering chamber,
a polarity exceeding approximately 0.25 on the $E_T^N$ scale,
an oxygen content exceeding that of reduced graphene oxide, and
an atomic ratio of carbon to oxygen of 2:1 such that the polar graphene oxide filter medium is effective to remove the biological contaminants from the fuel upon flow of the fuel therethrough.

16. A method for removing microorganisms from fuel, the method comprising:
introducing a flowing fuel into a fuel storage vessel through a fuel inlet, wherein:
a polar graphene oxide filter medium resides in the fuel storage vessel;
the polar graphene oxide filter medium comprises:
a honeycomb monolayer of carbon atoms functionalized with at least one reactive oxygen functional group, wherein the honeycomb monolayer is functionalized with silver nanoparticles, and wherein the honeycomb monolayer is configured as a coating on at least one surface of the fuel storage vessel,
a polarity exceeding approximately 0.25 on the $E_T^N$ scale,
an oxygen content exceeding approximately 15% and an atomic ratio of carbon to oxygen of 2:1; and
flow of the fuel through the polar graphene oxide filter medium is effective to remove the microorganisms from the fuel.

17. The method of claim 16, wherein the fuel is a hydrocarbon fuel.

18. The method of claim 16 wherein the flow of the fuel through the polar graphene oxide filter medium is gravity-induced.

19. The method of claim 16 wherein the flow of the fuel through polar graphene oxide filter medium is effective to remove water from the fuel.

20. The method of claim 16 wherein the removal of the microorganisms from the fuel is effective to prevent biodeterioration thereof.

21. The fuel storage vessel of claim 1 wherein the thickness of the coating is between 50 micrometers and 1 millimeter.

22. The fuel storage vessel of claim 1 wherein the thickness of the coating is between 200 micrometers and 1 millimeter.

23. The fuel storage vessel of claim 1 wherein the polar graphene oxide filter medium is a nanomaterial sheet functionalized with silver nanoparticles.

24. The fuel storage vessel of claim 1 wherein the silver nanoparticles are bound to the honeycomb monolayer.

25. The fuel storage vessel of claim 1 wherein the polar graphene oxide filter medium consists essentially of the honeycomb monolayer.

26. The fuel storage vessel of claim 1 wherein the polar graphene oxide filter medium consists of the honeycomb monolayer.

\* \* \* \* \*